(12) United States Patent
Hundley et al.

(10) Patent No.: US 10,933,352 B2
(45) Date of Patent: Mar. 2, 2021

(54) EMULSION FOAM REDUCER FOR WET PROCESSING OF CELLULOSE OR WOODBASED PRODUCTS OR IN FOOD PROCESSING

(71) Applicant: STATE LINE HOLDINGS, LLC, Ridgeway, VA (US)

(72) Inventors: Joseph W. Hundley, Martinsville, VA (US); Steven A. Dunwoody, Castle Hayne, NC (US); David M. Hundley, Ridgeway, VA (US)

(73) Assignee: STATE LINE HOLDINGS, LLC., Ridgeway, VA (US)

( * ) Notice: Subject to any disclaimer, the term of this patent is extended or adjusted under 35 U.S.C. 154(b) by 275 days.

(21) Appl. No.: 15/551,831

(22) PCT Filed: Feb. 18, 2016

(86) PCT No.: PCT/US2016/018431
§ 371 (c)(1),
(2) Date: Dec. 20, 2017

(87) PCT Pub. No.: WO2016/134124
PCT Pub. Date: Aug. 25, 2016

(65) Prior Publication Data
US 2018/0021698 A1 Jan. 25, 2018

Related U.S. Application Data

(60) Provisional application No. 62/117,934, filed on Feb. 18, 2015.

(51) Int. Cl.
| | |
|---|---|
| *B01D 19/04* | (2006.01) |
| *A23L 27/00* | (2016.01) |
| *A23L 29/10* | (2016.01) |
| *D21H 17/02* | (2006.01) |
| *D21H 17/04* | (2006.01) |
| *D21H 17/06* | (2006.01) |
| *D21H 17/14* | (2006.01) |
| *D21H 17/60* | (2006.01) |
| *D21H 17/64* | (2006.01) |
| *D21H 17/00* | (2006.01) |
| *D21H 21/12* | (2006.01) |
| *D21H 21/20* | (2006.01) |
| *D21H 27/18* | (2006.01) |

(52) U.S. Cl.
CPC .......... *B01D 19/0404* (2013.01); *A23L 27/80* (2016.08); *A23L 29/10* (2016.08); *B01D 19/04* (2013.01); *B01D 19/0413* (2013.01); *D21H 17/02* (2013.01); *D21H 17/04* (2013.01); *D21H 17/06* (2013.01); *D21H 17/14* (2013.01); *D21H 17/60* (2013.01); *D21H 17/64* (2013.01); *D21H 17/72* (2013.01); *D21H 17/74* (2013.01); *D21H 21/12* (2013.01); *D21H 21/20* (2013.01); *D21H 27/18* (2013.01); *A23V 2002/00* (2013.01)

(58) Field of Classification Search
CPC ........ D21H 21/12; D21H 17/60; D21H 17/74; D21H 17/14; D21H 17/02; D21H 17/04; D21H 17/64; D21H 17/72; D21H 21/20; D21H 27/18; D21H 17/00; D21H 17/03; D21C 3/28; B01D 19/0404; B01D 19/0413; B01D 19/04; B01D 19/00; A23L 27/80; A23L 29/10; C11D 3/0026
See application file for complete search history.

(56) References Cited

U.S. PATENT DOCUMENTS

| | | | | | |
|---|---|---|---|---|---|
| 1,957,514 | A | * | 5/1934 | Wolfson | B01D 19/0404 106/148.1 |
| 2,563,856 | A | * | 8/1951 | McGinn | D21H 21/12 516/132 |
| 2,563,857 | A | * | 8/1951 | McGinn | D21H 21/12 516/132 |
| 2,645,617 | A | * | 7/1953 | Mayhew | D21H 17/14 516/132 |

(Continued)

FOREIGN PATENT DOCUMENTS

| | | | | | |
|---|---|---|---|---|---|
| CA | 2976910 | A1 | * | 8/2016 | ............. B01D 19/04 |
| CN | 101508857 | | | 8/2009 | |

(Continued)

OTHER PUBLICATIONS

European Search Report dated Jun. 3, 2019 in European Application No. EP 16 75 3043.

(Continued)

*Primary Examiner* — Jose A Fortuna
(74) *Attorney, Agent, or Firm* — B. Aaron Schulman; Stites & Harbison, PLLC

(57) ABSTRACT

An emulsion is provided for defoaming water used in processing of various products such as cellulose or woodbased products or in food processing which is formed by reacting a fatty acid with a compound selected from the group consisting of ammonia, sodium, potassium and combinations thereof so as to form a water soluble soap, dispersing the water soluble soap in water and homogenizing the dispersed water soluble soap with hydrophobic oil or hydrocarbon oil to produce the emulsion. Methods for preparing the emulsion and using the emulsion are also provided. The emulsion is advantageous in that it can improve water resistance and/or reduce the use of water resistant additives during processing of cellulose or woodbased products or food-grade products.

11 Claims, No Drawings

(56) References Cited

U.S. PATENT DOCUMENTS

| | | | |
|---|---|---|---|
| 3,637,869 A * | 1/1972 | Seinzinger | B01D 19/0404 568/624 |
| 3,677,963 A * | 7/1972 | Lichtman | B01D 19/0404 516/116 |
| 5,100,697 A | 5/1992 | Nielsen | |
| 5,326,499 A | 7/1994 | Wegner et al. | |
| 5,486,306 A | 1/1996 | L'Hostis et al. | |
| 6,358,898 B1 * | 3/2002 | James | A61K 8/06 510/130 |
| 6,740,133 B2 | 5/2004 | Hundley, Jr. | |
| 6,860,911 B2 | 3/2005 | Hundley | |
| 6,864,292 B1 * | 3/2005 | Dyllick-Brenzinger | B01D 19/0404 162/158 |
| 7,651,541 B2 | 1/2010 | Hundley et al. | |
| 7,763,664 B2 * | 7/2010 | Bonn | B01D 19/0404 106/504 |
| 7,862,630 B2 | 1/2011 | Hundley et al. | |
| 7,879,917 B2 * | 2/2011 | Cheng | B01D 19/0404 516/117 |
| 7,893,115 B2 * | 2/2011 | Cheng | B01D 19/0404 516/117 |
| 9,018,265 B2 * | 4/2015 | Matsumura | B01D 19/0404 516/131 |
| 9,719,050 B2 * | 8/2017 | Panandiker | C11D 3/0026 |
| 10,005,007 B2 * | 6/2018 | Fan | D21H 17/74 |
| 10,124,277 B2 * | 11/2018 | Vance | B01D 19/0404 |
| 10,293,279 B2 * | 5/2019 | Hatchman | B01D 19/0404 |
| 2006/0128884 A1 * | 6/2006 | Cheng | B01D 19/0404 524/588 |
| 2011/0213053 A1 * | 9/2011 | Wu | B01D 19/0404 523/427 |
| 2015/0240189 A1 * | 8/2015 | Panandiker | C11D 3/0026 510/107 |
| 2016/0107103 A1 * | 4/2016 | Fan | D21H 17/74 162/179 |
| 2017/0218307 A1 * | 8/2017 | Panandiker | C07C 211/09 |
| 2018/0021698 A1 * | 1/2018 | Hundley | B01D 19/04 162/172 |

FOREIGN PATENT DOCUMENTS

| | | | |
|---|---|---|---|
| CN | 103550961 | 2/2014 | |
| DE | 4127719 A1 * | 2/1993 | D21H 17/00 |
| EP | 0 180 630 | 10/1998 | |
| GB | 957959 | 5/1964 | |
| WO | WO-8505066 A1 * | 11/1985 | B28B 7/384 |
| WO | WO-2010108859 A1 * | 9/2010 | B01D 19/0404 |
| WO | WO-2014179127 A1 * | 11/2014 | B28B 7/384 |
| WO | WO-2016134124 A1 * | 8/2016 | B01D 19/04 |

OTHER PUBLICATIONS

International Search Report dated Apr. 6, 2016 in International Application No. PCT/US2016/18431.
Written Opinion dated Apr. 6, 2016 in International Application No. PCT/US2016/18431.
International Preliminary Report on Patentability dated Aug. 22, 2017 in International Application No. PCT/US2016/18431.
Supplementary European Search Report dated Aug. 10, 2018 in European Application No. EP 16 75 3043.

* cited by examiner

EMULSION FOAM REDUCER FOR WET PROCESSING OF CELLULOSE OR WOODBASED PRODUCTS OR IN FOOD PROCESSING

CROSS-REFERENCE TO RELATED APPLICATIONS

The present application claims the benefit of U.S. Provisional Application Ser. No. 62/117,934, filed Feb. 18, 2015, said application being incorporated in its entirety herein by reference.

FIELD OF THE INVENTION

The present invention relates in general to a method of reducing foam and entrained air in industrial water processes with an efficient and low cost defoamer/antifoaming agent. The present invention can also contribute to improved water resistance or reduced use of water resistant additives when used in wet process cellulose or wood based products. The invention can also be used in food processing, in particular for treatments employing alum (aluminum sulfate) and other similar compounds, e.g., in pickle processing.

BACKGROUND OF THE INVENTION

Foam and entrained air are problems that affect processing efficiency and product quality in a number of industries. These industries can include manufacturing processes for food grade products as well as manufacturing processes for pulp and paper products. Foam and entrained air are particular costly problems within the pulp and paper industries. Foam and entrained air reduces efficiency and impacts surface quality of paper, paperboard and other wet process wood based products. Water based foam is usually destabilized by reducing the surface tension of the bubbles or by introducing a finely divided solid which are water insoluble or hydrophobic. These small particles, when in contact with the bubble, thin the bubble at the point of contact and causes bubble to pop. Some of the water insoluble solids used are fatty acids reacted with metals like aluminum, calcium, magnesium, iron, and zinc. Calcium stearate, magnesium stearate, iron stearate, aluminum stearate and zinc stearate are all used. Non polar oils, solvents, or liquid hydrocarbons that contribute to the destabilization of the bubble may be used to disperse the insoluble solid. This dispersion may be used as is or emulsified. One of the problems with some current defoaming emulsions is the emulsion has to have a sufficiently high viscosity to keep hydrophobic particles suspended. This can cause difficulty in pumping, particularly if some of the suspended particles settle out. Another issue is the soaps used to make these defoamer emulsions have a negative effect on the level of water resistance produced in fiberboard, hardboard and cellulose based products made with the wet process. Defoamers that are not an emulsion also may have a negative impact on the level of water resistance produced due to inclusion of wetting agents and detergents. Building codes require a minimum level of water resistance as a required specification for manufactured board. If manufactured board does not have a sufficient water resistance property it will swell, change dimensions, degrade and can be expensive to replace in a building. In the manufacture of cellulose board products made with the wet process, the level of water resistance is a key specification for board used in the building industry. Water resistance is a measure of how much water will soak into the wood based product under controlled conditions usually tested by submerging in water for 2 hours or 24 hours. High water absorption in manufactured board causes board to grow in dimensions, lose strength, and degrade when exposed to moisture. The water resistance test standard is further described in ASTM C-209.

The present invention overcomes problems of high viscosity and the negative impact of the detergents and wetting agents on level of water resistance when used in wet processes with hardness or aluminum ions.

This present invention centers on using a foaming agent to emulsify non-polar compounds such as but not limited to oils and waxes to produce a defoaming agent. In water based systems which have foam and contain sufficient ions of calcium, magnesium, iron, aluminum, or zinc, the new defoamer in the present invention works without the addition hydrophobic insoluble particles. Instead of adding these particles, the particles are formed by the fatty acid soap reacting with the previous listed ions. The addition of non-polar oils, fats, wax, solvents and blends thereof to form emulsion improves the effectiveness of the defoamer. The foaming agent is selected from water soluble fatty acids soaps which react with soluble metals, anions and cations in the industrial water, to form an insoluble hydrophobic particle. These newly formed particles then pop bubbles when they come in contact with bubbles. Liquid hydrocarbon and nonpolar solvents or fuels have been used as defoamers both as a liquid and in emulsion form. Including these hydrocarbons into this soap based emulsion makes an effective defoamer. By selecting food grade components, it can be used in systems that require food grade defoamers. The present invention produces an emulsion which does not require high viscosity to suspend solids and the formulation does not include detergents or wetting agents which may negatively impact the water resistance performance of the final product.

Another embodiment of the present invention centers on formulating the emulsion to use as a product for adding to the process water or to the head box in the production process of fiberboard, hardboard, and cellulose based products made with an aqueous process in order to produce a water resistance attribute of the final product as well as act as a defoamer product. In water based systems which contain sufficient ions of calcium, magnesium, iron, aluminum, or zinc, the new emulsion in this embodiment of the present invention works by the fatty acid soap reacting with the previous listed ions in a similar manner as the defoamer product. The non-polar oils, fats, wax, solvents and blends thereof to form the emulsion create the water resistant properties in the final product.

Volatile hydrocarbons can create opacity conditions in manufacturing processes where a heat treatment, drying or curing process step is employed. This opacity condition will limit process line speeds and limits production rates driving up costs. Using fewer hydrocarbons reduces emissions potential. Using an emulsion helps conserve natural resources by reducing the percentage of hydrocarbon and replacing with water. In processes where a manufactured board is produced, the board is pressed or dried at an elevated temperature. The higher the temperature is the more important selecting low volatile materials becomes. High volatile materials contribute to opacity and smoke and can cause manufacturing plants to exceed emission limits. This can limit production and productivity if not addressed with raw material selection. In processes where volatility is an issue such as a heat treatment, drying or curing process, less volatile non polar oil, solvents, and blends of waxes may be used. This may be done to reduce emissions such as smoke or VOC's; the temperature and process condition of the heat treatment, drying or curing process help determine which non polar additives can be used.

In processes where low volatility and water resistance attribute of the final product are both important, non-polar waxes may be used. The carbon chain distribution of the waxes can be used to help select which waxes would smoke more and which waxes will smoke less during the heat treatment, drying or curing process step. Waxes with a higher percentage of chain length in the C20 to C26 will generally smoke more than a wax with a lower percentage in the C20 to C26 range. The flash point, normal paraffin content and oil content may be useful in selecting which waxes to use or test. A simple mass loss test where weighed samples of waxes are heated to process temperature and held in an oven for an hour then reweighed to determine percentage of wax vaporized is useful in selecting the best wax as far as volatility.

The carbon chain distribution analysis can also be used to predict which wax would impart the best level of water resistance. For low volatile waxes, waxes with a higher percentage of C29 to C36 would be expected to create a higher level of water resistance than a wax with a lower percentage in the C29 to C36 range and with a higher percentage greater than C40. The normal paraffin content also plays a role in creating water resistance where straight chain (normal paraffin) create a higher level of water resistance than branched and cyclic paraffin.

In processes where volatility is not an issue waxes with higher percentage of chain length in the C24 to C30 would be expected to produce a good level of water resistance and defoamer properties.

Wax emulsions made with fatty acids reacted with ammonia exhibit defoaming properties and water resistant properties and work effectively with process water which contains hardness or aluminum ions. Reduction in the pounds of wax used in some applications has been greater than 20 percent and the need for a separate defoamer reduced or eliminated. Using less wax will also reduce emissions if any of the wax is volatilized during processing.

The addition of finely divided hydrophobic insoluble solids may be helpful in systems that do not contain enough ions that form a hydrophobic insoluble solid when reacted with the water soluble soap. Masking agents may be added to give a pleasing smell. Viscosity modifiers may be added to increase or decrease viscosity. The addition of solids builder like clays may also be added to the emulsion to impart properties and to lower cost. Additional emulsifiers may be added to improve stability as long as they do not interfere with exchange reaction or cause a decrease in water resistance.

SUMMARY OF THE INVENTION

In accordance with the present invention, composition and methods are provided to produce and introduce a defoaming agent into industrial process water, food products that contain alum, as well as waste streams. The method contemplates producing a foaming agent, adding non polar oil and emulsifying thus producing a defoaming agent, adding defoaming agent to industrial water at a point for maximum foam control. Maximum effectiveness is dependent on hardness of water where ions of calcium, magnesium, iron, aluminum, or zinc (hardness) is present in sufficient concentration for an exchange reaction to take place. An example of this exchange reaction in a water solution is as follows:

Water Soluble Soap+Water Soluble Metal
  Salt=Soluble Salt+Insoluble Organometallic
  Solid, for example:

Ammonium Stearate+Aluminum Sulfate yields
  Ammonium Sulfate and Aluminum Stearate In this example Aluminum Stearate is formed which is a water insoluble solid capable of disrupting the bubble film and causing bubble to pop. Aluminum Stearate is hydrophobic and can contribute to improved level of water resistance in wood based products.

The Ammonium Stearate will react in a similar way with ions of Magnesium, Calcium, Iron, and Zinc to form Magnesium Stearate, Calcium Stearate, Iron Stearate, and Zinc Stearate which are water insoluble and solids.

Although the preferred Fatty Acid is reacted with Ammonium hydroxide to form Ammonium Stearate other water soluble Stearate soaps may be used or made. Examples are Sodium Stearate made from Stearic Acid and Sodium Hydroxide, Potassium Stearate made from Stearic Acid and Potassium Hydroxide or of combination of ammonium, sodium or potassium stearate or fatty acids. The great advantage of this new defoamer emulsion is when the soap in the emulsion reacts with the ions it no longer acts as soap. No longer functioning as soap helps improve the level of water resistance in a manufactured board product. This is a valuable attribute of the wet process manufactured board industry. The level of water resistance is one of the key specifications that must be met. Adding most soaps reduces the level of water resistance and is usually overcome by adding more wax or some other water resistance additive.

In the above examples Stearic Acid is used. Other fatty Acids may be substituted in place of the Stearic Acid as long as they can form water soluble soap, and undergo an exchange reaction with Aluminum, Magnesium, Calcium, Iron or Zinc and form an insoluble solid.

In addition to the fatty acid Stearic Acid, other fatty acids may be used to react with ammonia, sodium, and potassium to form water soluble soap among these are the saturated fatty acids Caprylic, Capric, Lauric, Myristic, Palmitic, Arachidic, Behenic, Lignoceric and Cerotic. Unsaturated Fatty Acids will also form water soluble soaps when reacted with Ammonia, Potassium and Sodium. The unsaturated Fatty Acids Myristic, Palmitoleic, Sepienic, Oleic, Elaidic Vaccennic, Linoleic, Linolaidic, Arachidonic, Eicosapentaenoic, Erucic, Docosahexexaenoic, Tall oil, and mixtures thereof may be used to form a water soluble soap. These soaps will not improve the level of water resistance until they react with ions of aluminum, calcium, magnesium, iron or zinc. Other metal ions will also react with this fatty acid soap to form a water insoluble particle. It is expected that the presence of ions of lead, copper, cadmium, and other heavy metals will also be effective in forming the hydrophobic particles needed to pop bubbles.

The Fatty Acid may be selected from both the saturated and unsaturated and contain either a single fatty acid or a combination of two or more fatty acids. Additionally the fatty acid may be reacted with Ammonia, Sodium, or Potassium or a combination of Ammonia, Sodium, or Potassium. Emulsions made with fatty acids reacted with ammonia exhibit lower viscosity and increased stability over both potassium and sodium. With regard to pH, a range of pH may be used in the process, such as pH 5 or higher, or in the range of pH 6 to 9, but in general, the more basic the ingredients are, the better the stability of the process. For example, a pH of 8 is more stable than a pH of 7, a pH of 9 is more stable than a pH of 8, and a pH of 10 is more stable than a pH of 9. In general, although pH can be in the range of 6 to 9, the preferred pH for the most stabile emulsion is a pH of 9 or above, and more preferably, 10 or above. While the lower pH's can be used in the present process, it has generally been found that the stability increases as the pH is increased in emulsion. Decreasing the solids content and increasing the fatty acid content can also increase the stability of the emulsion.

The non-polar hydrocarbon may be selected from any hydrocarbon oil, wax or solvent. Some examples of non-polar hydrocarbon are vegetable oil, biodiesel, methyl ester, mineral oil, paraffin oil, paraffin wax, kerosene, diesel, and mineral spirits or other non-polar solvent or oil, or combinations thereof. The selection of non-polar hydrocarbon should be selected based on process and processing conditions. The process temperatures as well as environmental control like a thermal oxidation unit are used to select the non-polar hydrocarbon. Non-polar hydrocarbons with short chain lengths are more volatile than long chain length hydrocarbon thus long chain length hydrocarbons would be used when volatility is an issue. Most commercial grade waxes are blends of many different chain lengths and structure. Selecting the best waxes depends on process conditions. A manufactured board process that dry's board at 350 degrees F. can use a wax that would be too volatile for a process that dry's board at 550 degrees F.

During the process of developing a high solids wax emulsion with a viscosity less than 200 centipoise, the following relationships were discovered: The solids content could be increased as the fatty acid content was reduced. The solids content could be increased as the pH was increased. The solids content could be increased by increasing the particle size. Shear stability and stratification could be improved by lowering the solids content increasing fatty acid content, and decreasing the particle size. Soft water generally is used to make the emulsions. Small amounts of hardness in the water used to make the emulsion, was observed as having very little effect on emulsion.

During the development of a defoamer using bio diesel, the soap solution was tested as a defoamer without any non-polar hydrocarbon added to the soap solution. The soap solution was determined not to be effective as a defoamer when used alone. The bio diesel was tested by itself and found it did not break foam as quick as the emulsion with the ammonium soap and bio diesel. This new emulsion defoamer was more effective as defoamer, lower in cost and contributing to lower emissions during drying of wood based products.

Water resistant additive and method for improved water resistance in manufactured board or wood products. Method includes manufacturing emulsion and applying to wood or to process to achieve improved water resistance and in some cases less foam in wet process systems. Emulsion consists of water, Fatty acid, ammonia, and paraffin wax or oil and blends thereof; a method of imparting water resistance to manufactured board, paperboard or other wood based products. Method includes manufacturing emulsion consisting of water, paraffin wax or paraffin oil and combinations thereof, ammonia stearate or other ammonia fatty acid soap, Method includes adding or making hot water solution of ammonia fatty acid soap, then adding paraffin wax or paraffin oil or combinations thereof to hot soap solution and mixing and homogenizing until particle size is reduced sufficiently to produce stable emulsion: Adding emulsion to manufactured board, paperboard or other wood based product in a manner to evenly distribute emulsion in process or with the wood or wood fiber or pulp; method includes soap portion undergoing an exchange reaction, where the soap is no longer a soap, but is a water resistant compound; Method includes drying or pressing to produce the finished product.

A method is provided for making insulation board, hardboard, paperboard, and other products made with the wet process paper process; said method including refining wood or wood chip into fiber adding binder, flocculants like aluminum sulfate, and adding wax emulsion consisting of blends of paraffin wax and/or paraffin oil, Fatty acid soap neutralized with ammonia, like ammonium stearate. The method includes adding emulsion to process water in a manner to evenly distribute wax emulsion and to allow for the fatty acid soap to react with the aluminum from the aluminum sulfate or hardness ions to form water resistant additive like aluminum stearate thus changing soap in the emulsion into water resistant additive and contributing to defoamer properties. The method of the invention allows for reduced wax usage or improved water resistant properties in the final product while reducing foam; method includes the drying and in some cases the pressing steps to make final product. This present invention overcomes many of the deficiencies of defoamers used in wet process systems by reacting with hardness ions. The soap in the present invention is no longer soap after reacting with process water. Thus it does not interfere with water resistance, but contributes to improved water resistance. One embodiment can be made entirely of sustainable plant or animal based hydrocarbons. Another embodiment, low volatile hydrocarbons can be selected to reduce air emissions, while imparting water resistance. In some cases a 20 -35 percent reduction in water resistant additive has been achieved while maintaining water resistant properties. When the same hydrocarbon is used in a different formulation, the present invention will generate less air emissions by virtue of using less hydrocarbon material.

DETAILED DESCRIPTION OF THE INVENTION

Testing of Defoamer:

Defoamer effectiveness was determined by the following method: Fill quart jar half full with water with foam issue. Put on jar lid and shake vigorously. Note foam generated and add one drop of defoamer. Observer the defoamers' effect on foam, then put lid on jar, and shake vigorously again. To compare two different defoamers, two jars are used and attached together with tape so that each liquid is exposed to the same vigorous shaking. This method was used to determine effective range of formulation. It was observed that the soap solution by itself was not as effective as the emulsion defoamer. The non-polar oils were not as effective as the emulsion defoamer. For this liquid one of the most effective defoamer contained 15 to 40 percent ammonium stearate and biodiesel or diesel or mineral oil or vegetable oil. Decreasing the water percentage increases the cost without observed benefit. There may be benefit of higher solids in other defoamer application or diluting before use with water.

The selection of which hydrophobic oil, hydrocarbon oil or non-polar hydrocarbon used in defoamer emulsion depends on what other properties are important. For example: Vegetable oils and bio-diesel produce less water resistance than kerosene, paraffin oil and paraffin wax. The soaps once reacted with the previously listed ions prevent this new defoamer made with bio-diesel and vegetable oil from destroying water resistance even when used in excess. To improve water resistance of a pulp or fiberboard product, Kerosene or petroleum diesel is better than vegetable oil or bio-diesel. If VOC emissions are important then canola oil is better than corn oil, Bio-diesel is better than petroleum diesel, Paraffin oil or wax is better than petroleum diesel. Emulsions made with paraffin oil or wax can improve water resistance of a pulp or manufactured board product, while having an impact on reducing foam. If food grade is important then food grade components must be used. Suitable food grade applications include pulp, paper and food or food processes that contain aluminum sulfate (alum) like some pickles. Waste water which contains enough of the ions needed to produce insoluble organometallic solids could also benefit from this new defoamer.

Exemplary methods to make the defoamer are as follows:

Method A

Add fatty acid to water heated above the melt point of the Fatty Acids or add Fatty acid to water and heat until Fatty acid melts. Mix and add base containing Ammonia, Sodium, or Potassium, forming soap solution with a pH of at least 9. To this soap solution, add a non-polar solvent, oil, or other non-polar hydrocarbon and homogenize the solution to form a stable emulsion.

Method B

Add fatty acid soap containing ammonia, potassium, or sodium to water and mix while ensuring that the pH is at least 9. To this soap solution then add non polar liquid and homogenize or reduce particle size enough to prevent separation forming a stable emulsion.

Method C

Add all ingredients to mix tank and homogenize.

The following non-limiting Examples are provided which reflect embodiments of the invention (with the percentages being given by weight):

EXAMPLE 1

| | |
|---|---|
| Water | 5-95% |
| Stearate soap selected from Ammonium Stearate, Potassium Stearate or Sodium Stearate or combinations thereof: | 0.2-20% |
| Biodiesel or methyl ester | 2-90% |

EXAMPLE 2

| | |
|---|---|
| Water | 5-95% |
| Stearate soap selected from Ammonium Stearate, Potassium Stearate or Sodium Stearate or combinations thereof, | 0.2-20% |
| Non Polar Hydrocarbon | 2-90% |

EXAMPLE 3

Water

Stearate soap selected from Ammonium Stearate, Potassium Stearate or Sodium Stearate Non polar hydrocarbon selected from Kerosene, diesel, mineral spirits, mineral oil and other liquid non polar solvents or fuels and combinations thereof.

EXAMPLE 4

Water
Ammonia, potassium, or sodium fatty acid soap
Liquid non polar hydrocarbon

EXAMPLE 5

Water
Ammonia, potassium, or sodium fatty acid soap
Non polar hydrocarbon selected from Kerosene, diesel, mineral spirits, or mineral oil

EXAMPLE 6

Water
Ammonia, potassium, or sodium fatty acid soap
Non polar hydrocarbon selected from corn, palm, peanut, canola or other vegetable oil

EXAMPLE 7

| | |
|---|---|
| Bio diesel or Methyl Ester | 55-100% |
| Water insoluble hydrophobic solid like Aluminum, Calcium, Magnesium or Zinc Stearate | 0-45% |
| Viscosity modifier as needed | |

EXAMPLE 8

| Emulsion Composition | |
|---|---|
| Water | 5-95% |
| Fatty Acid | 0.4%-20% |
| Base selected from ammonia, or solutions of ammonia, or hydroxide of sodium or potassium, or combinations thereof | 0.02-5% |
| Hydrophobic oil, hydrocarbon oil or hydrophobic wax | 2-90% |

EXAMPLE 9

| Emulsion Composition | |
|---|---|
| Water | 5-95% |
| Stearic Acid | 0.4%-20% |
| Ammonia | 0.02-5% |
| Hydrocarbon oil selected from the group consisting of bio diesel, diesel, Kerosene, mineral spirits, mineral oil, vegetable oil or fat, and combinations thereof: | 2-90% |

EXAMPLE 10

Water resistant additive and method for improved water resistance in manufactured board or wood products. Method includes manufacturing emulsion and applying to wood or to process to achieve improved water resistance and in some cases less foam.

| | |
|---|---|
| Water | 30-85% |
| Stearic Acid or other Fatty Acid which makes a stable emulsion | 0.2%-15% |
| Ammonia As required to make soap | 0.02-4% |
| Paraffin Wax or oil or combinations thereof | 14-69% |

EXAMPLE 11

An emulsion composition comprising

| | |
|---|---|
| Water | 30-80% |
| Stearic Acid | 0.4%-10% |
| Ammonia | 0.02-5% |
| Bio Diesel | 8-69% |

What is claimed is:

1. A method of reducing foam in water used in processing of manufactured board, paperboard or other cellulose or wood based product or food processing, comprising:
   providing an emulsion formed by reacting a fatty acid that can form a water-soluble soap with a material selected from the group consisting of ammonia, solutions of ammonia, hydroxides of sodium or potassium, and combinations thereof, so as to form a water-soluble soap with a pH of 5 or greater, dispersing the water-soluble soap in water and homogenizing soap solution with a material selected from the group consisting of hydrocarbon oil, hydrophobic hydrocarbon oil, hydrocarbon wax, non-polar hydrocarbon liquid, biodiesel, and combinations thereof;
   adding said emulsion to the water used in processing of manufactured board, paperboard, or other cellulose or wood based product or in food processing in a manner to distribute the emulsion into the process water so as to allow the fatty acid soap in said emulsion to undergo an exchange reaction with hardness ions or aluminum ions in the processing water so as to form hydrophobic particles and thus change the soap into a water-resistant or hydrophobic particle or compound; while also suppressing or eliminating foam in the processing water.

2. The method of claim 1 wherein the emulsion comprises by weight:

| | |
|---|---|
| Water | 5-95% |
| Stearic Acid | 0.4%-20% |
| A base selected from the group consisting of ammonia, solutions of ammonia, hydroxides of sodium or potassium, and combinations thereof | 0.02-5% |
| Hydrophobic hydrocarbon oil, Hydrocarbon Oil or Hydrophobic wax | 2-90%. |

3. The method of claim 2 wherein the hydrocarbon oil is selected from the group consisting of bio diesel, diesel, Kerosene, mineral spirits, mineral oil, vegetable oils or fats, and combinations thereof.

4. The method of claim 2 wherein the pH of the emulsion is between 6 and 9.

5. The method of claim 1 wherein the emulsion comprises by weight:

| | |
|---|---|
| Water | 30-80% |
| Stearic Acid | 0.4%-10% |
| A base selected from the group consisting of ammonia and solutions of ammonia | 0.02-5% |
| Paraffin wax or paraffin oil or blends thereof: | 14-69%. |

6. A method of improving water resistance in a finished product and reducing foam in water used in processing of manufactured board, paperboard or other cellulose or wood based product, comprising:
   providing an emulsion formed by reacting a fatty acid with ammonia forming a water-soluble soap with a pH greater than 6, dispersing soap in water and homogenizing the soap and water with a material selected from the group consisting of hydrophobic hydrocarbon wax, slack wax, paraffin wax, paraffin oil, hydrocarbon oil, and hydrophobic hydrocarbon oil;
   adding said emulsion to the water used in processing of manufactured board, paperboard or other cellulose or wood based product in a manner to distribute emulsion into the process so as to allow the fatty acid soap in said emulsion to undergo an exchange reaction with hardness ions or aluminum ions in the processing water so as to form hydrophobic particles or compound and thus change the soap into a water resistant compound; while also suppressing foam in the processing water wherein the method further comprises drying or pressing the manufactured board, paperboard or other cellulose or wood based product to produce a finished manufactured board, paperboard or other cellulose or wood based product with improved or lower cost water resistance.

7. The method of claim 6 wherein the emulsion comprises by weight:

| | |
|---|---|
| Water | 5-95% |
| Stearic Acid | 0.4%-20% |
| A base selected from the group consisting of ammonia, solutions of ammonia, hydroxides of sodium or potassium, and combinations thereof | 0.02-5% |
| Hydrophobic oil, Hydrocarbon oil, or Hydrocarbon wax | 2-90%. |

8. The method of claim 7 wherein the hydrocarbon oil is selected from the group consisting of bio diesel, diesel, Kerosene, mineral spirits, mineral oil, vegetable oils or fats, and combinations thereof.

9. The method of claim 7 wherein the pH of the emulsion is between 6 and 9.

10. The method of claim 9 wherein the pH of the emulsion is greater than 9.

11. The method of claim 6 wherein the emulsion comprises by weight:

| | |
|---|---|
| Water | 30-80% |
| Stearic Acid | 0.4%-10% |
| A base selected from the group consisting of ammonia and solutions of ammonia | 0.02-5% |
| Paraffin wax or paraffin oil or blends thereof: | 14-69%. |

\* \* \* \* \*